United States Patent [19]

Murray et al.

[11] 4,343,011
[45] Aug. 3, 1982

[54] FACSIMILE APPARATUS

[75] Inventors: Thomas M. Murray, 7117 Wood Hollow, Austin, Tex. 78731; Lloyd G. Richardson, Austin, Tex.

[73] Assignee: Thomas M. Murray, Austin, Tex.

[21] Appl. No.: 131,163

[22] Filed: Mar. 17, 1980

[51] Int. Cl.³ .................... G01D 15/28; B41F 13/10; B41F 21/00; B60B 9/00
[52] U.S. Cl. .................................. 346/138; 101/375; 101/415.1; 29/117
[58] Field of Search ................ 346/138, 141; 271/277; 400/527.1; 101/375, 415.1; 29/117

[56] References Cited

U.S. PATENT DOCUMENTS 1,085,056 1/1914 McLaughlin ..................... 400/527.1
2,800,332 7/1957 Steinbach ....................... 29/117 UX
3,400,648 9/1968 Izmailov et al. .................. 29/117 X

FOREIGN PATENT DOCUMENTS 535205 1/1957 Canada ............................. 29/117

Primary Examiner—George H. Miller, Jr.
Attorney, Agent, or Firm—James E. Bradley

[57] ABSTRACT

A facsimile system has improved features for receiving copy medium and for printing. The system has a cylindrical rotatably driven drum that has an expansion device that allows the drum to expand its effective diameter. When the unit is used as a receiver, a cylindrical loop of copy medium is inserted over the drum, when the drum is in its reduced diameter position. Then the expansion device is actuated to enlarge the diameter and tightly constrain the copy medium. The same device may be used to transmit, since the expansion device utilizes a slot formed along the periphery of the drum. The slot opens to receive the edge of an original document when the expansion device is in the reduced diameter position. The slot closes to retain the document when the expansion device is rotated to the enlarged diameter position. The printing is accomplished by a solenoid actuated hammer that presses a ribbon against the copy medium while the drum rotates.

3 Claims, 7 Drawing Figures

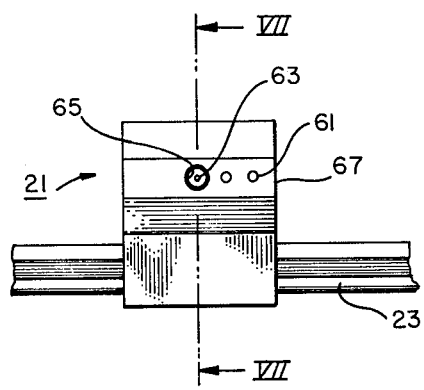
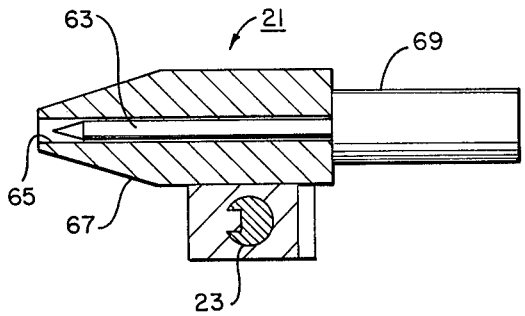
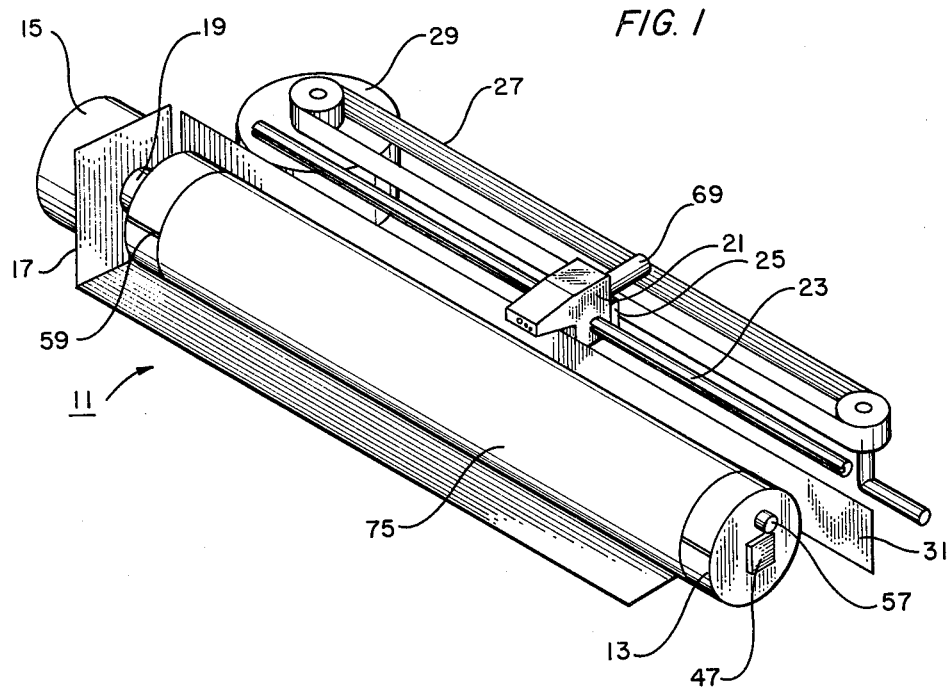

FACSIMILE APPARATUS

BACKGROUND OF THE INVENTION

1. Field of the Invention

This invention relates in general to facsimile transmitting and receiving devices particularly of the type that transmit such facsimiles over a telephone network.

2. Description of the Prior Art

Facsimile transmitting and receiving devices are in use for transmitting the contents of a document to a remote location, typically over telephone networks. In general, the devices have a rotatably driven drum. The document to be transmitted is secured around the drum. A scanning element is moved linearly across the document as the drum rotates. The scanning element detects differences in light intensity due to variations in the reflectivity of the scanned document. A photoelectric device in the scanning element converts the variations in light intensity into electric signals. The electric signals are transmitted to a receiving unit, which simultaneously converts the signals into images, producing a facsimile of the original document.

The receiving unit, which may be identical to the transmitting unit, has a rotatably driven drum that receives a sheet of copy medium, such as specially prepared paper. A printing head moves linearly across the drum as the drum rotates, and simultaneously creates an impression on the copy medium as the scanning head detects and transmits.

One problem concerns aligning the right and left hand margins on the copy medium with the margins on the original document. The scanning element of the transmitter has to be in alignment with the edge of the margin at the same time that the printing element of the receiving unit is in alignment with the edge of the margin. Otherwise, the material in the facsimile will be off-centered.

In U.S. Pat. Nos. 3,872,239 and 3,975,590, proposals are shown to eliminate the need for aligning the margins. Basically, a copy medium sheet is employed that has adhesive strips on its side. The sheet is folded over the drum and secured into a closed loop with the adhesive. The printing instrument may begin at any point. Once the facsimile has been completed, the loop of the copy medium is cut at an appropriate margin.

One disadvantage of this system is that the adhesive overlap may likely be in the middle or at any point in the sheet after removal. This may be objectionable for some uses. Also, specially prepared adhesive copy material is required.

Another disadvantageous feature in the prior art concerns the printing instrument. The type in general use has a high voltage unit that burns the copy medium at a given point when it receives a signal. This requires specially prepared copy medium, and is not workable with ordinary bond paper. Also, since the system requires high voltage and heat, it is expensive and may be more prone to failure than if these elements were not required. Printers that employ solenoid actuated hammers to strike a ribbon to transfer an image by pressure have been used for various purposes in the past. However, to applicant's knowledge, they have been used only with a flat sheet or with a drum that is stationary at the time of contact, not with a rotating drum. None have been used with facsimile transmitting devices, to applicant's knowledge.

SUMMARY OF THE INVENTION

It is accordingly a general object of this invention to provide an improved facsimile system.

It is a further object of this invention to provide an improved facsimile system that does not require synchronizing margins, and does not require copy sheets that must be adhered at their side edges after wrapping around the drum.

It is a further object of this invention to provide an improved facsimile system that employs a printing means that does not require high voltage and heat.

In accordance with these objects, a facsimile system is provided that utilizes a rotatably driven cylindrical drum. The drum has an expansion means for increasing the diameter. In the reduced diameter position, the drum will receive a closed loop of copy medium. When moved to the enlarged diameter position, the drum expands and tightens against the closed loop so that the copy medium will rotate with it. One end of the drum has a clearance that allows the closed loop to be placed on the unit, thereby avoiding the need for securing adhesive after placement.

Also, the drum has a slot along one side for receiving the edge of a sheet of paper for scanning and transmission. The slot is open when the drum is in the reduced position, and closes tightly to retain the sheet when the drum is moved to the enlarged diameter position.

The printing instrument uses a solenoid actuated hammer. The hammer reciprocates in response to the solenoid, striking a print ribbon for transferring an image to the paper by pressure. This allows plain bond paper to be used as the copy medium.

BRIEF DESCRIPTION OF THE DRAWINGS

FIG. 1 is a schematic representation of the major components of a facsimile apparatus constructed in accordance with this invention.

FIG. 6 is a partial enlarged front view of the scanning and printing head of the facsimile apparatus of FIG. 1.

FIG. 7 is a vertical sectional view of the printing and scanning head of the facsimile apparatus of FIG. 1, taken along the line VII—VII of FIG. 6.

DESCRIPTION OF THE PREFERRED EMBODIMENT

Figure 2:
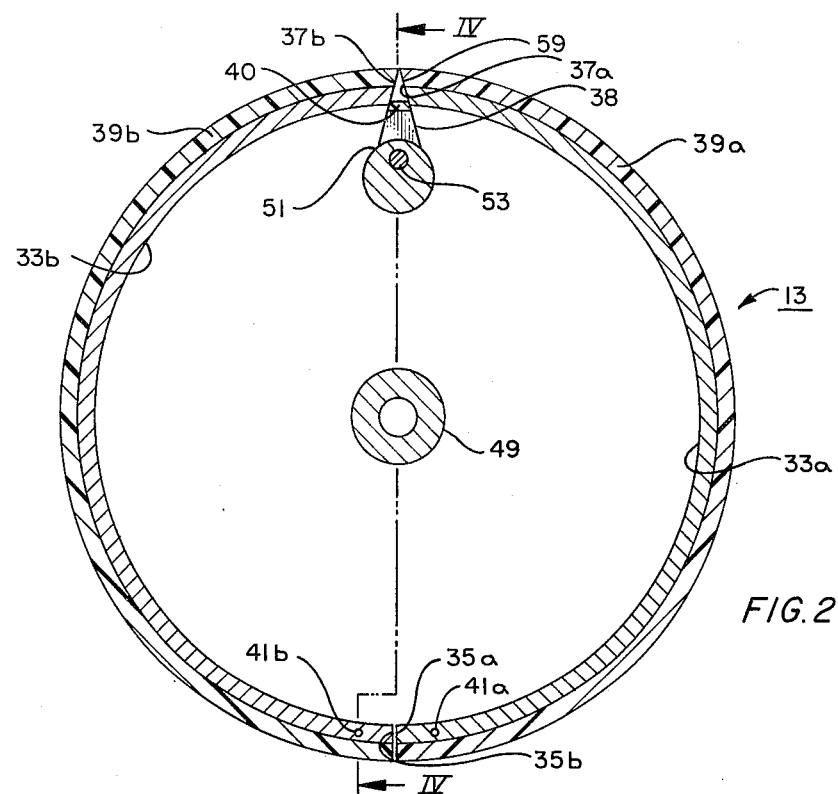
FIG. 2 is a vertical sectional view of the drum of the facsimile apparatus of FIG. 1, shown in the reduced diameter position.

Referring to FIG. 1, facsimile apparatus 11 includes a cylindrical drum 13. Drum 13 is rotatably driven by an electric motor 15. Electric motor 15 is mounted within a support 17 by bearings 19. Drum 13 is cantilevered from bearings 19, the opposite end being completely unsupported and having a clearance around it.

A printing and scanning head 21 is mounted adjacent the drum 13 on a supporting rod 23. Rod 23 is parallel with the longitudinal axis of the drum 13, and slidably carries the printing and scanning head 21, to allow it to move linearly with respect to the drum 13. The printing and scanning head 21 has gear teeth 25 that engage teeth (not shown) on a belt 27. Belt 27 is rotated by an electric motor 29. The motor 29 advances the printing and scanning head 21 an incremental distance along support rod 23 for each rotation of drum 13. A ribbon 31, of a conventional pressure type such as used in typewriters and adding machines, is drawn parallel with support rod 23 and between the drum 13 and the printing and scanning head 21 for printing.

Figure 3:
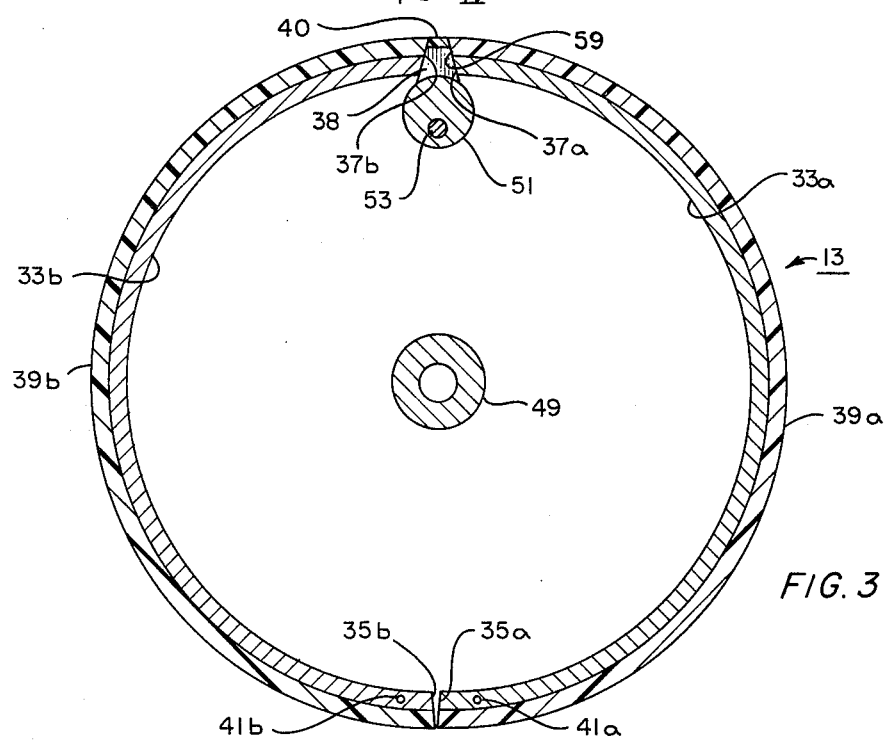
FIG. 3 is a vertical sectional view of the drum of the facsimile apparatus of FIG. 1, shown in the enlarged diameter position.

Referring to FIGS. 2 and 3, drum 13 includes two identical semi-cylindrical drum segments 33a and 33b. Each drum segment 33a and 33b is a semi-cylindrical rigid shell of metal or plastic. Each drum segment 33a, 33b has a first edge 35a and 35b, respectively, and a beveled second edge 37a and 37b, respectively. Edges 35a, 35b, 37a and 37b are parallel to the longitudinal axis of the drum. Drum segments 33a and 33b are adapted to juxtapose, as shown in FIG. 2, to define a cylindrical configuration. A wedge 38 is located between the drum segment second edges 37a and 37b. Wedge 38 extends the full length of drum 13 and has beveled sides that mate with the taper of the second edges 37a and 37b. The inner surface of wedge 38 is thus wider than its outer surface.

Resilient cushioning liners 39a and 39b are secured to the outer surfaces of the drum segments 33a and 33b for noise deadening mechanism during printing. A strip of wedge shaped liner 40 is secured to the outer surface of wedge 38.

Figure 4:
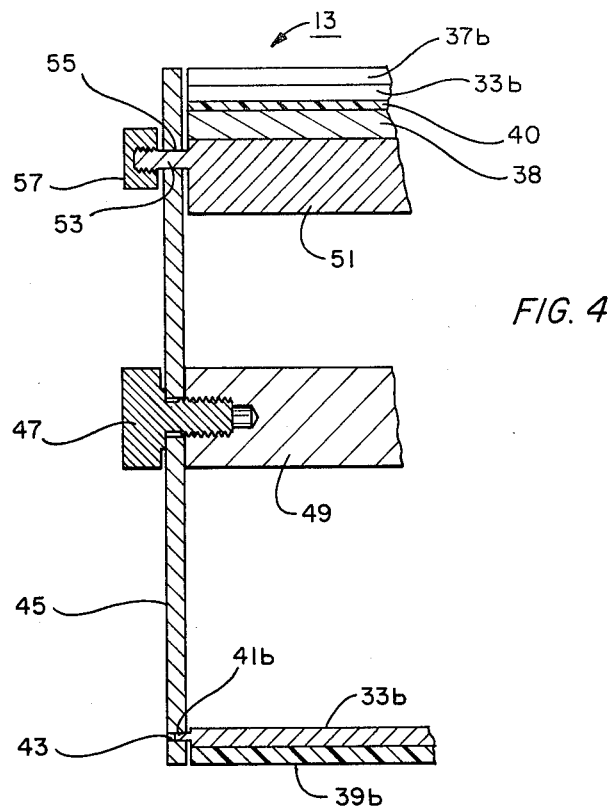
FIG. 4 is a partial sectional view of the drum of FIG. 1, taken along the line IV—IV of FIG. 2.

The drum segments 33a and 33b are retained together by retention means that includes a pair of pins 41a and 41b, each mounted at a single location close to the first edges 35a and 35b. As shown in FIG. 4, each pin 41a and 41b engages an aperture 43 formed in a plate 45. One plate 45 is located on each end of the drum 13, and consists of a circular disc. Plate 45 is retained by a bolt 47 secured in a rod 49. Rod 49 is coaxial with drum 13 and extends the full length of drum 13, securing the two plates 45 together perpendicular to the axis of drum 13.

Referring again to FIG. 2, an expansion means for expanding drum 13 between a reduced diameter position, shown in FIG. 2, to an enlarged diameter position, shown in FIG. 3, includes a rod 51. Rod 51 extends the full length of the drum 13 and has a finger 53 that protrudes through an aperture 55 in each plate 45, as shown in FIG. 4. Finger 53 is retained by a nut 57 on each end. Finger 53 is not located along the axis of the rod 51, rather is off centered. Finger 53 is rotatable within the plate aperture 55, allowing it to rotate the rod eccentrically, from the position shown in FIG. 2 to the position shown in FIG. 3. Rod 51 is parallel with the rod 49, and is located adjacent to second edges 37a and 37b and in contact with wedge 38. Rod 51 serves as wedging means, when rotated, for moving wedge 38 radially outward to urge the second edges 37a and 37b apart to enlarge the diameter of drum 13, as shown in FIG. 3. In the reduced diameter position shown in FIG. 2, a slot 59 is opened. The pins 41a and 41b urge the segments 33a and 33b back toward each other. Slight flexibility in the drum segments 33a and 33b, as well as slight looseness in the joint at the first edges 35a and 35b, allow movement between the reduced and enlarged diameter positions.

Referring to FIG. 6, the printing and scanning head 21 includes a conventional optical transmitter and receiver indicated generally by the numeral 61. Referring to FIG. 7, the printing unit includes a hammer 63 that consists of a cylindrical shaft, having a pointed end and reciprocally carried within the bore 65 of a housing 67. Hammer 63 reciprocates forwardly and rearwardly against the ribbon 31 by means of an electrical solenoid 69. Although only a single hammer 63 is shown, in practice, multiple hammers 63 and solenoids 69 will be used, probably seven. For illustration purposes, ribbon 31 is shown drawn in front of the printing and scanning head 21. In practice it will be a cartridge and the optical transmitter and receiver 61 will be located above or below the hammer 63 so as to avoid interference with the ribbon 31.

Figure 5:
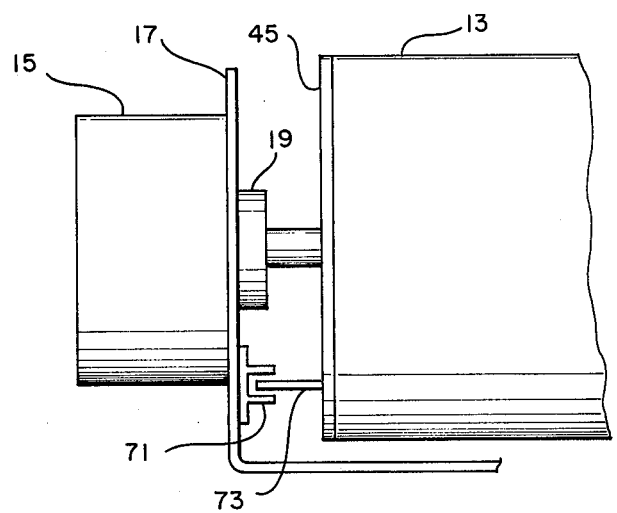
FIG. 5 is a schematic side view of a portion of a drum and drive means of the facsimile apparatus of FIG. 1.

An optical limit switch is shown in FIG. 5 to determining rotational speed of the drum 13 and to send a synchronizing pulse to the receiving unit. The optical switch includes a photocell unit 71 that transmits a light beam between two flanges. Photocell unit 71 is secured to the vertical support 17 that also supports the electric motor 15. A breaker bar 73 is secured to the plate 45 adjacent the motor 15, and is aligned to pass through the two flanges of the photocell unit 71 during each revolution. This breaks the continuity of the photocell unit, to send an electrical pulse.

In operation, one facsimile unit 11 must be prepared to transmit and another to receive. Nut 57 is rotated to rotate the eccentric rod 51 to reduced diameter shown in FIG. 2, opening the slot 59. One side edge of the document to be transmitted is inserted in the slot 59. Then, nut 57 is rotated to rotate the eccentric rod 51 to the enlarged diameter position to move the wedge 38 radially outward. The wedge 38 grips the document and closes the slot 59. Fingers (not shown) of a conventional nature are located below the drum 13 to slidingly contact drum 13 to retain the original document around the drum 13. The printing and scanning head 21 should be located at the beginning side of the original document.

On the receiving end, the same apparatus is used to receive as to transmit. First, the eccentric rod 51 is rotated to place the drum 13 in the reduced diameter position. In this position, a preformed cylindrical sleeve 75 (FIG. 1) of plain paper is inserted over the drum 13. The clearances around drum 13 allow this insertion. Sleeve 75 will be slightly larger in diameter than the drum 13 when its segments 33a and 33b are in the reduced diameter position shown in FIG. 2. Once in position, the eccentric rod 51 is rotated outward. Wedge 38 acts against the second edges 37a and 37b, forcing them apart and thereby enlarging the effective diameter of the drum 13. In the enlarged diameter position, the drum 13 is truly cylindrical, while in the reduced diameter position, the drum 13 is not precisely cylindrical. The diameter of the copy sleeve 75 is substantially the same as the drum 13 diameter when enlarged. Preferably it is selected so that when the drum is in the enlarged diameter position, the effective diameter of the drum 13 will be slightly larger than the sleeve 75. This difference causes drum 13 to tightly retain the sleeve 75 for rotation with the drum. Liners 39a and 39b may deform slightly. On the receiving unit, the printing and scanning head 21 should also be located at the beginning side of the copy sleeve 75. However, since there are no side edges on the cylindrical sleeve 75, a margin does not have to be synchronized with the original document.

Both units are caused to rotate by their motors 15. On the transmitting unit, the scanning unit 61 transmits light, and detects the variations in light intensity corresponding to the markings on the original document, as the drum 13 rotates. Signals corresponding to this variation of light intensity will be sent over the telephone network, or other type of network, to the receiving unit. The receiving unit will actuate the solenoid 69 to drive the hammer 63 into contact with the ribbon 31. The force will be transmitted to the copy sleeve 75, as the drum 13 rotates, leaving an impression due to the transferable characteristics of the ribbon 31. With each rotation of the drums 13, motors 29 will incrementally advance the printing and scanning heads 21 along the shafts 23 until the document has been completely reproduced. Pulses from the optical limit switch 71 will be used to synchronize the rotation speeds of the drums of the receiving and transmitting units.

After the facsimile has been completed, the sleeve 75 may be removed by first moving the eccentric rod 51 into position to reduce the diameter of the drum 13. The sleeve may be cut at an appropriate margin before or after removal. A lengthwise space will exist at some point in the sleeve 75 corresponding to the right and left hand margins on the original document. This space is slit to provide the desired margins. The original document may be removed from the transmitting unit by rotating the eccentric rod 51 inward, opening the slot 59, and allowing the document to be withdrawn.

The invention has several advantages. The cantilevered, expansible drum allows a preformed cylindrical sleeve to be inserted on the unit. This avoids the need for adhering edges after installation. The expansible means also serves to retain an original document by closing and opening a slot. By using a print head with a ribbon, high voltage and heat requirements are avoided.

While the invention has been shown in only one of its forms, it should be apparent that it is not so limited, but is susceptible to various changes and modifications without departing from the spirit thereof.

We claim:

1. In a facsimile system, the improvement comprising:
    a generally cylindrical rotatably driven drum having expansion means for increasing the diameter of the drum from a reduced diameter position for receiving a closed loop of copy medium, to an enlarged diameter position for securing the copy medium to the drum for rotation therewith, to record transmitted signals on the copy medium;
    the drum being cantilevered from one end to allow the closed loop of copy medium to be inserted over the drum from the other end;
    the expansion means comprising two semi-cylindrical drum segments, each having first and second edges parallel with its axis, the two segments being juxtaposed to define a cylindrical configuration;
    retention means for retaining the first edges together and fur urging the second edges toward each other; and
    wedging means for selectively forcing the second edges apart from each other to expand the diameter of the cylindrical configuration;
    the retention means comprising a pair of plates, one mounted on each end of the juxtaposed segments, each segment being pinned to each of the plates at a single point adjacent its first edge to urge the segments together; and
    the wedging means comprising an eccentric rod rotatably mounted between the plates adjacent the second edges, and a wedge mounted between the second edges, and in contact with the rod so that rotation of the rod forces the wedge radially outward to force the second edges apart.

2. In a facsimile system, the improvement comprising:
    a generally cylindrical rotatably driven drum having an axially aligned slot on its periphery extending the length of the drum parallel with the axis of the drum;
    means for moving the drum between a reduced diameter position to an enlarged diameter position; and
    a copy medium comprising a cylindrical sleeve preformed into a loop prior to insertion over the drum, the sleeve having a diameter greater than the diameter of the drum when in the reduced diameter position, but substantially the same diameter as the drum when in the enlarged diameter position, allowing the drum to receive the copy medium when the drum is in the reduced diameter position, and to secure the copy medium for rotation therewith when the drum is in the enlarged diameter position, the drum also being adapted to receive for transmission the edge of a document sheet in the slot when in the reduced diameter position, the slot closing to secure the sheet for rotation therewith when in the enlarged diameter position.

3. In a facsimile system, an improved drum means for receiving documents for transmission and copy medium for printing, comprising:
    two semi-cylindrical drum segments, each having first and second edges parallel with its axis, the two segments being juxtaposed to define a cylindrical configuration;
    a pair of plates, one mounted on each end of the juxtaposed segments, each segment being pinned to the plates at a single point adjacent its first edge to urge the segments together for receiving a preformed cylindrical sleeve of copy medium; and
    an eccentric rod rotatably mounted between the plates adjacent the second edges; and a wedge mounted between the second edges and in contact with the rod so that rotation of the rod from a reduced diameter position to an enlarged diameter position forces the wedge radially outward to force the second edges apart to enlarge the diameter of the cylindrical configuration for securing the copy medium to the segments for rotation therewith, the second edges also providing a slot when in the reduced diameter position to receive the edge of a document for transmission, the wedge gripping the edge of the document when moved to the enlarged diameter position.

* * * * *